US007664725B2

(12) United States Patent
Murray et al.

(10) Patent No.: US 7,664,725 B2
(45) Date of Patent: Feb. 16, 2010

(54) METHOD AND APPARATUS FOR TRANSPARENTLY MAPPING A REQUEST TO OPEN A DATA FILE

(75) Inventors: Calum Murray, Santa Rosa, CA (US); Roy Goldman, Cupertino, CA (US); Bruce A. Wobbe, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 556 days.

(21) Appl. No.: 11/490,578

(22) Filed: Jul. 21, 2006

(65) Prior Publication Data

US 2008/0021911 A1    Jan. 24, 2008

(51) Int. Cl.
*G06F 17/30* (2006.01)
(52) U.S. Cl. .................................. 707/1; 707/6; 707/10
(58) Field of Classification Search .................. 707/1–3, 707/100, 200, 5, 6, 10, 101; 709/216–218, 709/226
See application file for complete search history.

(56) References Cited

U.S. PATENT DOCUMENTS 6,728,716 B1 * 4/2004 Bhattacharya et al. ........ 707/10
7,237,027 B1 * 6/2007 Raccah et al. ................. 707/10
7,340,447 B2 * 3/2008 Ghatare .......................... 707/3
2004/0220932 A1 * 11/2004 Seeger et al. .................... 707/8

* cited by examiner

*Primary Examiner*—Mohammad Ali
*Assistant Examiner*—Marc R Filipczyk
(74) *Attorney, Agent, or Firm*—Park, Vaughan & Fleming LLP; Mark Spiller

(57) ABSTRACT

One embodiment of the present invention provides a system that transparently maps a request to open a data file. First, the system receives a request from a user or client application to open the data file. Next, the system determines from file meta information that the file is a relational data file, and proceeds to transparently map the file open operation to a corresponding relational database operation by discovering a database service configured to manage the relational data file and then sending a request to open the relational data file to this database service. By transparently mapping the file open operation to the corresponding relational database operation, the system allows an underlying data file to be changed to a relational data file without changing the way the user interacts with the client application and/or data file.

31 Claims, 3 Drawing Sheets

METHOD AND APPARATUS FOR TRANSPARENTLY MAPPING A REQUEST TO OPEN A DATA FILE

BACKGROUND

Related Art

The present invention generally relates to client-server computer systems.

Computer-based applications often access data which is stored in files. For example, a financial application typically operates on data which is stored in a "company file." As such applications become increasingly more sophisticated, significant advantages can be gained by moving from a simple company file to a more-sophisticated database system, which is controlled by a database server. Using a more-sophisticated database system can provide improved performance, reliability, and scalability, especially for larger company files and simultaneous users.

However, it is typically necessary to configure a database server to operate in specific modes depending upon location of the data and the types of file accesses which are desired. For example, it may be necessary to configure the database server to access a remote file, or to support multi-user accesses to a file. This can be a problem because application users are typically used to existing file-based data operations, and are not very knowledgeable about the technical details related to invoking and/or configuring a database server. Hence, the desire to preserve a simple user experience may limit the improvements that can be incorporated into a system.

SUMMARY

One embodiment of the present invention provides a system that transparently maps a request to open a data file. First, the system receives a request from a user or client application to open the data file. Next, the system determines from file meta information that the file is a relational data file, and proceeds to transparently map the file open operation to a corresponding relational database operation by discovering a database service configured to manage the relational data file and then sending a request to open the relational data file to this database service. By transparently mapping the file open operation to the corresponding relational database operation, the system allows an underlying data file to be changed to a relational data file without changing the way the user interacts with the client application and/or data file.

In a variation on this embodiment, the relational data file and the database service are hosted on the same computing device.

In a variation on this embodiment, the relational data file and the database service are hosted on different computing devices.

In a further variation, the client application is hosted on: the same computing device as the relational data file; the same computing device as the database service; or on a computing device that hosts neither the relational data file nor the database service.

In a variation on this embodiment, instances of the client application can include instances of the database service, potentially leading to multiple simultaneous instances of the database service. In this embodiment, one instance among these multiple instances manages access to the relational data file, and the system discovers this managing database service from among the multiple database service instances. Subsequent requests by instances of the client application to access the relational data file are then handled by this managing database service.

In a further variation, the system discovers the managing database service by:
  determining whether the computing device hosting the relational data file also hosts the managing database service;
  determining whether the computing device hosting the client application also hosts the managing database service;
  using a configuration file in proximity to the data file to assist in finding the managing database service; and/or
  using a network query and/or broadcast request to discover the managing database service.

In a further variation, the managing database service changes based on the behavior and actions of the user, the client application, and the multiple instances of the database services.

In a further variation, the request specifies that a given instance of the database service always serves as the managing database service.

In a further variation, if no managing database service is found, the system configures a local instance of the database service associated with the client application to become the managing database service.

DETAILED DESCRIPTION

Figure 1:
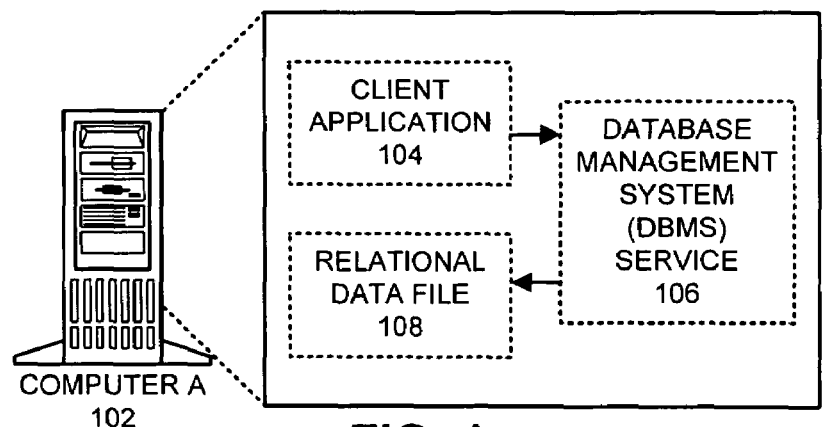
FIG. 1 illustrates a client application and database management system (DBMS) service executing on a computer in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Performance and User Interface Trade-Offs

As mentioned previously, as applications become increasingly more sophisticated, significant advantages can be gained by moving from a simple company file to a more-sophisticated database system controlled by a database server. Using a more-sophisticated database system can provide improved performance and scalability, especially for larger company files and simultaneous users.

However, typical system users may not be familiar with installing, configuring, and maintaining a more-complex database system. Many applications that incorporate databases are either single-user applications that use a database embedded into an application, with little or none of the database complexity directly exposed to the end-user, or use a heavy-weight multi-user database with an involved set-up procedure typically managed by a system administrator. In the latter case, such heavy-weight databases typically involve multiple files, and are not mobile. The system in one embodiment of the present invention provides the performance and scalability of a client-server database system while maintaining a database-transparent user experience with minimal or non-existent administration needs.

In typical non-database systems, applications store user data in files, and the user can browse through a file structure to select a data file and/or to invoke a client application related to the data file. This data file may be located on a local computing device, or may be present on a remote computing device but transparently displayed using a file browser run on the local computing device.

One embodiment of the present invention maintains this experience of "opening an ordinary file" on a local or remote file system using a standard file open user interface, but changes the data file to be a relational data file, and enhances the client applications to interact with a database management system (DBMS) that manages and operates upon the data in the relational data file. Multiple users in this system can continue to think of the relational data file as a "normal" file, as in previous systems, and can perform actions such as individually accessing and copying the file, while the system transparently invokes, maintains, and connects the client applications to a DBMS service that manages the relational data file. Hence, the system hides from the end-user the presence of the client-server database, thereby presenting unchanged system usability and maintaining a user experience of a single-file data management system yet also providing enhanced database functionality.

FIG. 1 illustrates a client application 104 and DBMS service 106 executing on a computer A 102. The client application 104 interacts with the DBMS service 106, which provides access to a relational data file 108.

Figure 2:
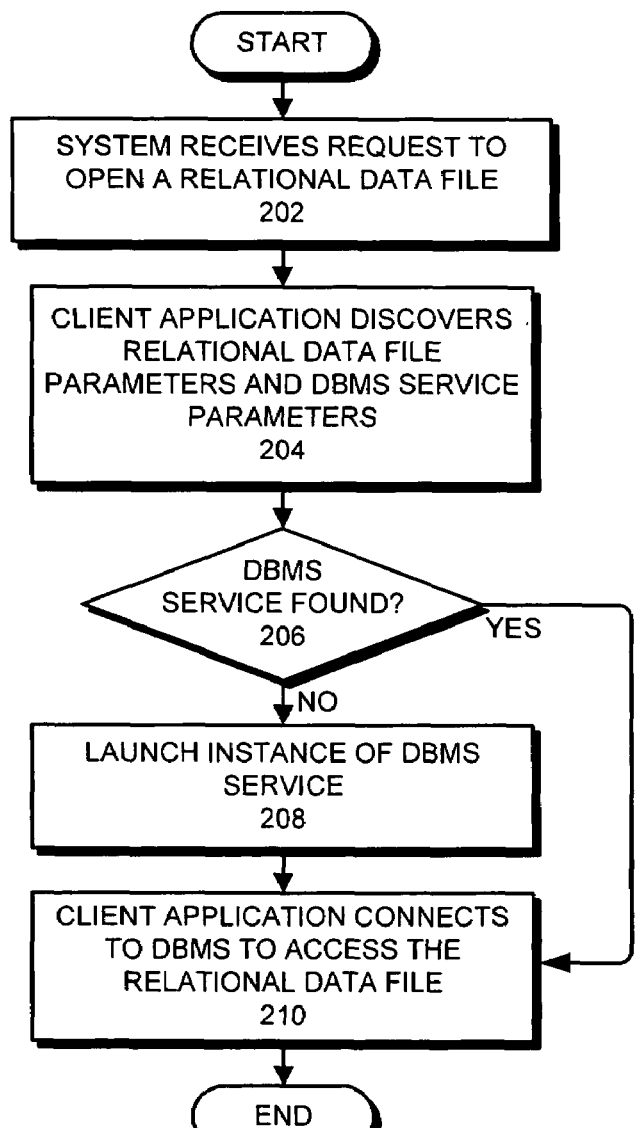
FIG. 2 is a flow chart illustrating the process of opening a relational data file by connecting to a DBMS in accordance with an embodiment of the present invention.

FIG. 2 is a flow chart illustrating the process of opening a relational data file by connecting to a DBMS service. First, the system receives a request to open a relational data file (step 202). This request can, for instance, be generated when a user selects a data file from a file browser, thereby triggering a client application associated with the file type of the data file by the operating system (e.g. Microsoft™ Windows™). Alternatively, the request may also be generated by the user selecting the file from within a client application. Upon determining that the data file is a relational data file, the system then determines a set of parameters for the relational data file and a DBMS service, if present (step 204). For instance, the client application can use an operating system application programmer interface (API) to ascertain whether the relational data file is local to the computer or on a remote server.

In one embodiment of the present invention, the system uses the location of the relational data file to determine whether an active DBMS service managing the file is already available on the computer hosting the relational data file. Alternatively, the system can also determine whether such a service is already active elsewhere by checking on the machine hosting the client application, using a network query or broadcast, and/or checking a configuration file in proximity to the relational data file.

If the system finds an active DBMS service for the relational data file (step 206), the client application proceeds to communicate with the DBMS service and attempt to access the relational data file through the DBMS using an appropriate database API (step 210). Note that connecting to the DBMS via the database API may involve additional steps such as the exchange of user credentials and/or other information. In one embodiment of the present invention, if the system does not discover an active DBMS service, the system launches an instance of the DBMS service on the computer hosting the client application (step 208), and then proceeds to access the relational data file by communicating with the newly-launched DBMS service (step 210). Note that some of these steps may vary in complexity depending on usage scenarios.

Single-User Scenarios

In the simplest usage scenario (shown in FIG. 1), the client application 104, the DBMS service 106, and the relational data file 108 are installed on a single system and accessed by a single user. In this scenario, the system may only search for the DBMS on the local machine (computer A 102), and only launch the DBMS service 106 when the client application 104 actually accesses the relational data file. Note that the system may balance the resource usage of the client application 104 and the DBMS 106 to optimize overall application performance on computer A 102.

Figure 3:
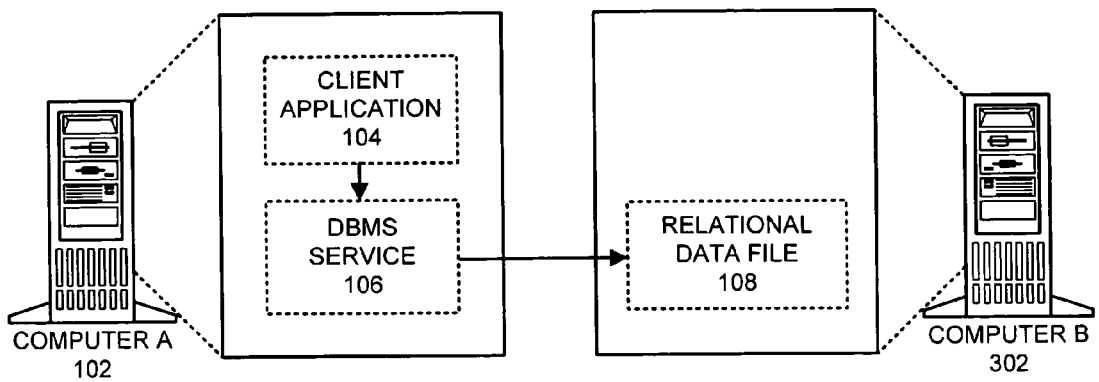
FIG. 3 illustrates a system configuration in which a client application and relational data file are located on separate computers in accordance with an embodiment of the present invention.

FIG. 3 illustrates a more complex single-user usage scenario in which the relational data file 108 is no longer co-located with the client application 104, but is instead stored on a remote computer B 302. This scenario might occur, for instance, if the relational data file is located on a separate file server with regular backups. In this scenario, the system may again proceed to use or launch a local instance of the DBMS service 106 on the same computer as the client application 106. While remote access to the relational data file may cause degraded performance due to network communication, other benefits from such a system organization may make this a desirable arrangement.

Multiple-User Scenarios

Figure 4:
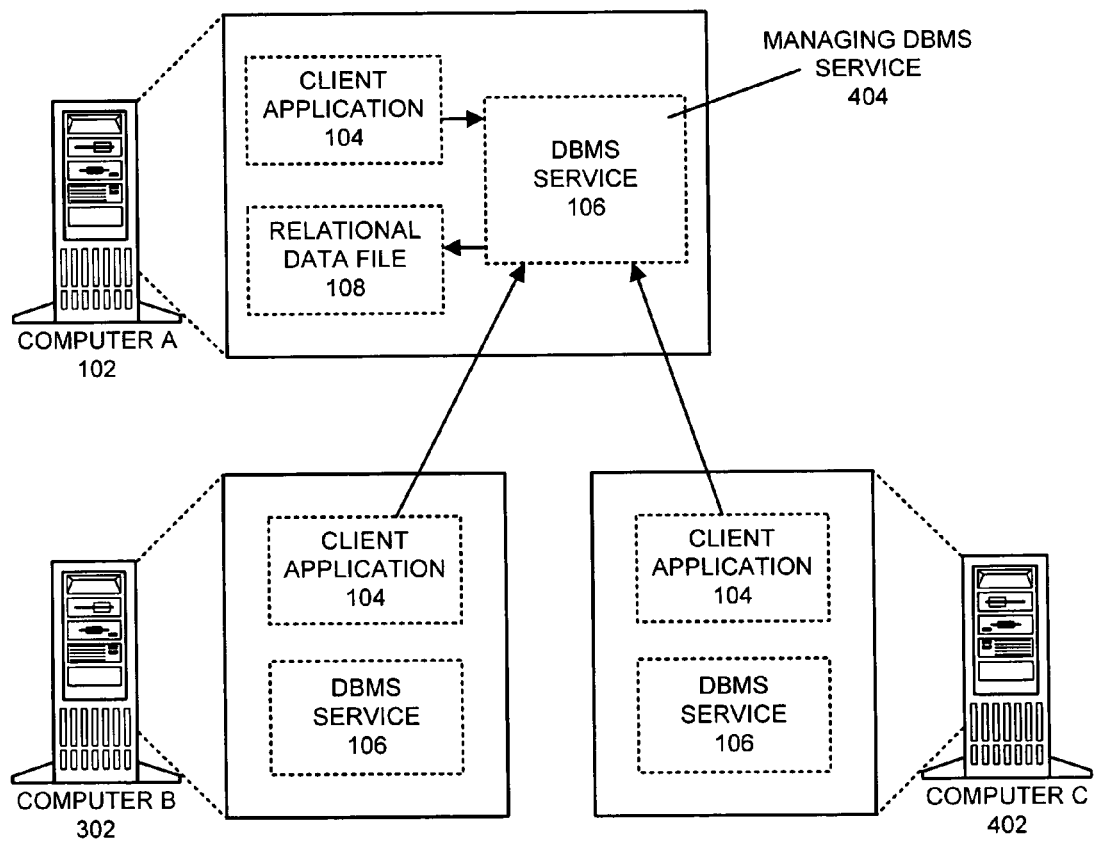
FIG. 4 illustrates a system configuration in which multiple client applications communicate with one computer that hosts the relational data file locally in accordance with an embodiment of the present invention.

The system can also transparently manage multiple-user scenarios. FIG. 4 illustrates a system configuration in which multiple instances of client application 104 communicate with one computer A 102 that hosts the relational data file 108 locally.

In one embodiment of the present invention, an instance of the DBMS service 106 can be installed in combination with each installed instance of the client application 104. Such a configuration allows different instances of the DBMS service 106 to manage access to the relational database file depending on access patterns, system operations and failures, and other factors. Note that typically only one instance of the DBMS service can actively manage access to the relational data file at a time, leaving most of the DBMS service 106 instances in FIG. 4 inactive or un-launched during operation.

In one embodiment of the present invention (shown in FIG. 4), a user or system administrator can decide to select one computer (such as computer A 102) to permanently host the relational data file 108 and the managing DBMS service 404 for this file, for instance by selecting an option of "host my company files for multiple-user access" in the instance of the client application 104 local to computer A 102. Other instances of the client applications 104 attempting to access the relational data file 108, such as those on computer B 302 and computer C 402, then follow the process shown in FIG. 2. When these client applications attempt to open the relational data file, they check whether the computer hosting the relational data file (computer A 102) also hosts a managing DBMS service 404 for the file, and proceed to find and communicate with computer A's 102 DBMS service 106. Note that the system can bias the resources or system parameters of computer A 102 to improve the performance of the DBMS service 106 if computer A 102 is expected to primarily provide data services, and not actively run an instance of the client application 104.

In a further embodiment, the first client application 104 to open the relational data file 108 and thereby activate a managing DBMS service 404 on the computer (hosting the prompting client application) takes charge exclusively of managing the relational data file 108, until such time that the managing client application 104 is terminated, the corresponding computer (hosting either the relational data file or the managing DBMS service) fails, and/or some other prompt for release occurs.

Figure 5:
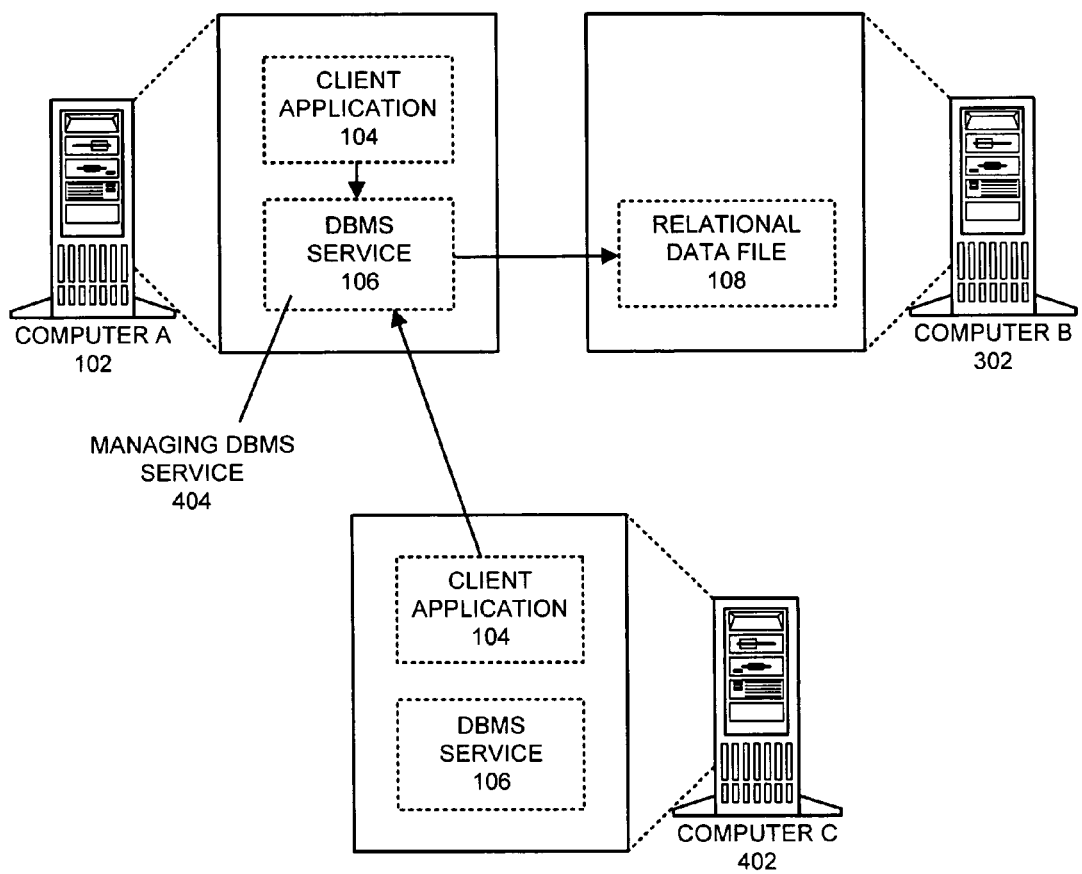
FIG. 5 illustrates a system configuration in which multiple users access a remote relational data file through a DBMS service on a separate computer in accordance with an embodiment of the present invention.

FIG. 5 illustrates a system configuration in which multiple users access a remote relational data file 108 through a DBMS service 106 on a separate computer A 102. If the client application 104 on computer A 102 attempts to access the relational data file 108 on computer B 302 first, the DBMS service instance 106 on computer A 102 activates to provide access to the relational data file 108. A subsequent access attempt by the client application 104 on computer C 402 finds that the file is already managed by the managing DBMS service 404 on computer A 102, and results in a connection from the client application 104 on computer C 402 to the managing DBMS service instance 404 on computer A 102. If at some later point computer A 102 fails, the client application 104 on computer C 402 might proceed to launch or activate the DBMS instance 106 on computer C 402 and take over the management of the relational data file 108 on computer B 302.

Note that preserving a transparent non-database user experience in the previous configuration may involve a performance penalty. For instance, the configuration in FIG. 5 may involve substantial time delay and network traffic, because data accesses by the client application 104 on computer C 402 need to travel first through the DBMS service 106 on computer A 102, then to the actual file on computer B 302, and back. Note also that while no assumptions can be made about where an active DBMS service may be running, users do need to know the location of the data file to properly access their data and thereby invoke the DBMS system. However, since knowing the location of the file follows with the existing single-data-file-based user experience, this presents no additional overhead.

Note that the technique in the present invention differs from an approach in which the data file is replaced by a stub file that contains information for locating a DBMS server. The relational data file in the present invention still includes the actual data used by the DBMS service, and thus can be copied and used transparently as a normal file, for instance when transported to a home computer using a portable storage medium. In the case of the stub file, if only the location information data is copied, the data may not be accessible without a network path to the DBMS server, thereby violating the abstraction of a normal file experience.

In summary, the present invention provides the performance and scalability of a client-server database system while maintaining a database-transparent user experience with minimal or non-existent administration needs. The system allows a user to invoke a file that triggers transparent access to the improved functionality and efficiency of the hidden client-server system. Note that the approach described in the present invention is not limited to data files mapped to relational data files, but can also be used generally to transparently map between other types of data files as well.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for transparently mapping a request to open a data file to a database access, comprising:
   receiving the request from a user or a client application to open the data file, wherein the data file is associated with meta information;
   determining from meta information for the data file that the data file is a relational data file associated with a database service which is provided by a database management system implemented in a computer system;
   wherein the user or client application operates on a device different from the device hosting the database service;
   transparently mapping a file open operation to a corresponding relational database operation by:
      searching for the database service configured to manage the relational data file, comprising:
         searching for the database service on the computing device hosting the data file and the computing device associated with the user or the client application:
         searching for the database service in a network environment using a network query; and
         searching for a configuration file in proximity to the data file that indicates the location of the database service;
      if the database service is not found, invoking an instance of the database service; and
      opening the relational data file by sending an open request to the database service;
   wherein transparently mapping the file open operation to the corresponding relational database operation facilitates hiding from the user the presence of the database service, thereby maintaining user experience of a single-file data management system while providing enhanced database functionality.

2. The method of claim 1, wherein the relational data file is hosted on a first computing device and the database service is hosted on the first computing device.

3. The method of claim 1, wherein the relational data file is hosted on a first computing device and the database service is hosted on a second computing device.

4. The method of claim 3, wherein the client application is hosted on: the first computing device; or
   a third computing device.

5. The method of claim 1,
wherein any instance of the client application can include an instance of the database service, and wherein one database service among multiple instances of the database service manages access to the relational data file;
wherein discovering the database service configured to manage the relational data file involves discovering the managing database service from among multiple instances of the database service; and
wherein subsequent requests by instances of the client application to access the relational data file are handled by the managing database service.

6. The method of claim 5, wherein discovering the managing database service further involves:
determining whether a computing device hosting the relational data file also hosts the managing database service;
determining whether the computing device hosting the client application also hosts the managing database service;
using a configuration file in proximity to the data file that assists in finding the managing database service; and/or
discovering the managing database service using a network query and/or broadcast request.

7. The method of claim 6, wherein the managing database service changes based on the behavior and actions of the user, the client application, and the multiple instances of the database services.

8. The method of claim 6, wherein the request further comprises specifying that a given instance of the database service always serve as the managing database service.

9. The method of claim 6, wherein, if no managing database service is found, discovering the managing database service further comprises configuring a local instance of the database service associated with the client application to become the managing database service.

10. A computer-readable storage medium storing instructions that when executed by a computer cause the computer to perform a method for transparently mapping a request to open a data file to a database access, comprising:
receiving the request from a user or a client application to open the data file, wherein the data file is associated with meta information;
determining from meta information for the data file that the data file is a relational data file associated with a database service which is provided by a database management system implemented in a computer system;
wherein the user or client application operates on a device different from the device hosting the database service;
transparently mapping a file open operation to a corresponding relational database operation by:
searching for the database service configured to manage the relational data file, comprising:
searching for the database service on the computing device hosting the data file and the computing device associated with the user or the client application;
searching for the database service in a network environment using a network query; and
searching for a configuration file in proximity to the data file that indicates the location of the database service;
if the database service is not found, invoking an instance of the database service; and
opening the relational data file by sending an open request to the database service;
wherein transparently mapping the file open operation to the corresponding relational database operation facilitates hiding from the user the presence of the database service, thereby maintaining user experience of a single-file data management system while providing enhanced database functionality.

11. The computer-readable storage medium of claim 10, wherein the relational data file is hosted on a first computing device and the database service is hosted on the first computing device.

12. The computer-readable storage medium of claim 10, wherein the relational data file is hosted on a first computing device and the database service is hosted on a second computing device.

13. The computer-readable storage medium of claim 12, wherein the client application is hosted on:
the first computing device;
or
a third computing device.

14. The computer-readable storage medium of claim 10,
wherein any instance of the client application can include an instance of the database service, and wherein one database service among multiple instances of the database service manages access to the relational data file;
wherein discovering the database service configured to manage the relational data file involves discovering the managing database service from among multiple instances of the database service; and
wherein subsequent requests by instances of the client application to access the relational data file are handled by the managing database service.

15. The computer-readable storage medium of claim 14, wherein discovering the managing database service further involves:
determining whether a computing device hosting the relational data file also hosts the managing database service;
determining whether the computing device hosting the client application also hosts the managing database service;
using a configuration file in proximity to the data file that assists in finding the managing database service; and/or
discovering the managing database service using a network query and/or broadcast request.

16. The computer-readable storage medium of claim 15, wherein the managing database service changes based on the behavior and actions of the user, the client application, and the multiple instances of the database services.

17. The computer-readable storage medium of claim 15, wherein the request further comprises specifying that a given instance of the database service always serve as the managing database service.

18. The computer-readable storage medium of claim 15, wherein, if no managing database service is found, discovering the managing database service further comprises configuring a local instance of the database service associated with the client application to become the managing database service.

19. An apparatus that transparently maps a request to open a data file to a database access, comprising:
a receiving mechanism configured to receive the request from a user or a client application to open the data file, wherein the data file is associated with meta information;
an identification mechanism configured to determine from meta information for the data file that the data file is a relational data file associated with a database service which is provided by a database management system implemented in a computer system;

a mapping mechanism configured to transparently map a file open operation to a corresponding relational database operation by:
  searching for the database service configured to manage the relational data file, comprising:
    searching for the database service on the computing device hosting the data file and the computing device associated with the user or the client application:
    searching for the database service in a network environment using a network query; and
    searching for a configuration file in proximity to the data file that indicates the location of the database service;
  if the database service is not found, invoking an instance of the database service; and
  opening the relational data file by sending an open request to the database service;
wherein the user or client application operates on a device different from the device hosting the database service;
wherein transparently mapping the file open operation to the corresponding relational database operation facilitates hiding from the user the presence of the database service, thereby maintaining user experience of a single-file data management system while providing enhanced database functionality.

20. The apparatus of claim 19,
wherein any instance of the client application can include an instance of the database service, and wherein one database service among multiple instances of the database service manages access to the relational data file;
wherein discovering the database service configured to manage the relational data file involves discovering the managing database service from among multiple instances of the database service; and
wherein subsequent requests by instances of the client application to access the relational data file are handled by the managing database service.

21. A method for transparently mapping a request to open a data file to a database access, comprising:
  sending the request to open the data file from a user or a client application to a computing device, wherein the data file is associated with meta information;
  wherein the computing device determines from meta information for the data file that the data file is a relational data file associated with a database service which is provided by a database management system implemented in a computer system;
  wherein the user or client application operates on a device different from the device hosting the database service;
  wherein the computing device transparently maps a file open operation to a corresponding relational database operation by:
    searching for the database service configured to manage the relational data file, comprising:
      searching for the database service on the computing device hosting the data file and the computing device associated with the user or the client application:
      searching for the database service in a network environment using a network query; and
      searching for a configuration file in proximity to the data file that indicates the location of the database service; and
    if the database service is not found, invoking an instance of the database service; and
    opening the relational data file by sending an open request to the database service; receiving notification that the data file has been opened;
  wherein transparently mapping the file open operation to the corresponding relational database operation facilitates hiding from the user the presence of the database service, thereby maintaining user experience of a single-file data management system while providing enhanced database functionality.

22. The method of claim 21, wherein the relational data file is hosted on a first computing device and the database service is hosted on the first computing device.

23. The method of claim 21, wherein the relational data file is hosted on a first computing device and the database service is hosted on a second computing device.

24. The method of claim 23, wherein the client application is hosted on:
  the first computing device;
  or
  a third computing device.

25. The method of claim 21,
wherein any instance of the client application can include an instance of the database service, and wherein one database service among multiple instances of the database service manages access to the relational data file;
wherein discovering the database service configured to manage the relational data file involves discovering the managing database service from among multiple instances of the database service; and
wherein subsequent requests by instances of the client application to access the relational data file are handled by the managing database service.

26. The method of claim 25, wherein discovering the managing database service further involves:
  determining whether a host computing device hosting the relational data file also hosts the managing database service;
  determining whether the host computing device hosting the client application also hosts the managing database service;
  using a configuration file in proximity to the data file that assists in finding the managing database service; and/or
  discovering the managing database service using a network query and/or broadcast request.

27. The method of claim 26, wherein the managing database service changes based on the behavior and actions of the user, the client application, and the multiple instances of the database services.

28. The method of claim 26, wherein the request further comprises specifying that a given instance of the database service always serve as the managing database service.

29. The method of claim 26, wherein, if no managing database service is found, discovering the managing database service further comprises configuring a local instance of the database service associated with the client application to become the managing database service.

30. An apparatus that transparently maps a request to open a data file to a database access, comprising:
  a transmission mechanism configured to send the request to open the data file from a user or a client application to a computing device, wherein the data file is associated with meta information; and
  wherein the computing device determines from meta information for the data file that the data file is a relational data file associated with a database service which is provided by a database management system implemented in a computer system;

wherein the user or client application operates on a device different from the device hosting the database service;

wherein the computing device transparently maps a file open operation to a corresponding relational database operation by:

searching for the database service configured to manage the relational data file, comprising:

searching for the database service on the computing device hosting the data file and the computing device associated with the user or the client application:

searching for the database service in a network environment using a network query; and searching for a configuration file in proximity to the data file that indicates the location of the database service;

if the database service is not found, invoking an instance of the database service; and opening the relational data file by sending an open request to the database service;

a receiving mechanism configured to receive notification that the data file has been opened;

wherein transparently mapping the file open operation to the corresponding relational database operation facilitates hiding from the user the presence of the database service, thereby maintaining user experience of a single-file data management system while providing enhanced database functionality.

31. The apparatus of claim 30, wherein any instance of the client application can include an instance of the database service, and wherein one database service among multiple instances of the database service manages access to the relational data file;

wherein discovering the database service configured to manage the relational data file involves discovering the managing database service from among multiple instances of the database service; and wherein subsequent requests by instances of the client application to access the relational data file are handled by the managing database service.

* * * * *